United States Patent [19]

Uehlinger

[11] 4,058,514

[45] Nov. 15, 1977

[54] ASYMMETRIC 1:2 CHROMIUM COMPLEXES OF MONOAZO COMPOUNDS HAVING 1-ARYL-3-METHYL-PYRAZOLONE-5 COUPLING COMPONENTS

[75] Inventor: Hanspeter Uehlinger, Basel, Switzerland

[73] Assignee: Sandoz Ltd., Basel, Switzerland

[21] Appl. No.: 552,241

[22] Filed: Feb. 24, 1975

[30] Foreign Application Priority Data

Feb. 28, 1974 Switzerland .................. 2827/74

[51] Int. Cl.² ........................................... C09B 45/16
[52] U.S. Cl. .................................. 260/145 B; 260/147; 260/163
[58] Field of Search .................. 260/145 B, 147, 163

[56] References Cited

U.S. PATENT DOCUMENTS

| | | | |
|---|---|---|---|
| 2,767,166 | 10/1956 | Strobel et al. | 260/147 |
| 2,806,760 | 9/1957 | Brassel et al. | 8/42 |
| 2,826,573 | 3/1958 | Strobel et al. | 260/147 |
| 2,832,760 | 4/1958 | Zickendraht et al. | 260/145 |
| 3,005,813 | 10/1961 | Brassel et al. | 260/145 |
| 3,144,437 | 8/1964 | Uehlinger | 260/147 |
| 3,356,671 | 12/1967 | Johnson et al. | 260/145 |
| 3,525,732 | 8/1970 | Beffa et al. | 260/145 |

FOREIGN PATENT DOCUMENTS

| | | | |
|---|---|---|---|
| 1,197,010 | 11/1959 | France | 260/163 |
| 1,271,857 | 7/1968 | Germany | 260/145 B |
| 2,408,224 | 10/1975 | Germany | 260/145 B |
| 355,238 | 8/1961 | Switzerland | 260/163 |

Primary Examiner—Allen B. Curtis
Assistant Examiner—John J. Doll
Attorney, Agent, or Firm—Gerald D. Sharkin; Richard E. Vila; Melvyn M. Kassenoff

[57] ABSTRACT

Asymmetric 1:2 chromium complexes of the formula in which
$R_1$ signifies a hydrogen or halogen atom or a nitro group,
$R_2$ signifies a hydrogen or halogen atom, a nitro or sulpho group,
$R_3$ signifies a hydrogen or halogen atom, or a lower alkyl radical,
$R_4$ signifies a hydrogen or halogen atom, a lower alkyl radical or a sulpho group,
each of $R_5$, $R_6$ and $R_7$, independently, signifies a hydrogen or halogen atom or a lower alkyl radical,
R signifies a hydrogen atom or a lower alkyl radical, and
$M^+$ signifies a cation,
with the provisos
i. the radicals $R_1$ and $R_2$ occupy the 4- and 6-positions,
ii. where $R_4$ signifies a sulpho group one of the radicals $R_1$ and $R_2$ signifies a halogen atom or a nitro group in the 4-position, and
iii. the compounds contain a single sulpho group which is in free acid or salt form, for natural and synthetic polyamides, natural and regenerated cellulose, polyurethanes, basically modified polyolefins, leather and metals such as anodized aluminum. The dyes possess notable fastness to light, wet treatments, ironing, solvents, rubbing, chlorine, carbonizing and decatizing and build up evenly from neutral dyebaths on polyamides.

30 Claims, No Drawings

ASYMMETRIC 1:2 CHROMIUM COMPLEXES OF MONOAZO COMPOUNDS HAVING 1-ARYL-3-METHYL-PYRAZOLONE-5 COUPLING COMPONENTS

The present invention relates to asymmetric 1:2 chromium complexes.

More particularly, the present invention provides asymmetric 1:2 chromium complex compounds of formula I,

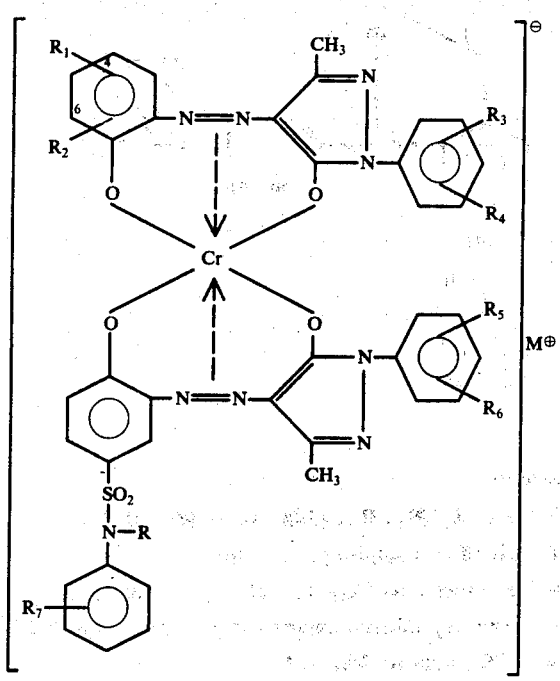

n which
- $R_1$ signifies a hydrogen or halogen atom or a nitro group,
- $R_2$ signifies a hydrogen or halogen atom, a nitro or sulpho group,
- $R_3$ signifies a hydrogen or halogen atom, or a lower alkyl radical,
- $R_4$ signifies a hydrogen or halogen atom, a lower alkyl radical or a sulpho group,
- each of $R_5$, $R_6$ and $R_7$, independently, signifies a hydrogen or halogen atom or a lower alkyl radical,
- R signifies a hydrogen atom or a lower alkyl radical, and
- $M^\oplus$ signifies a cation, vith the provisos
  i. the radicals $R_1$ and $R_2$ occupy the 4- and 6-positions,
  ii. where $R_4$ signifies a sulpho group one of the radicals $R_1$ and $R_2$ signifies a halogen atom or a nitro group in the 4-position, and
  iii. the compounds contain a single sulpho group which is in free acid or salt form.

The present invention also provides a process for the production of compounds of formula I, characterized by reacting the 1:1 chromium complex of a compound of formula II,

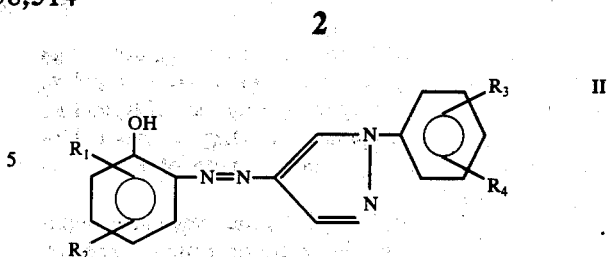

in which $R_1$, $R_2$, $R_3$ and $R_4$ are as defined above, with a compound of formula III,

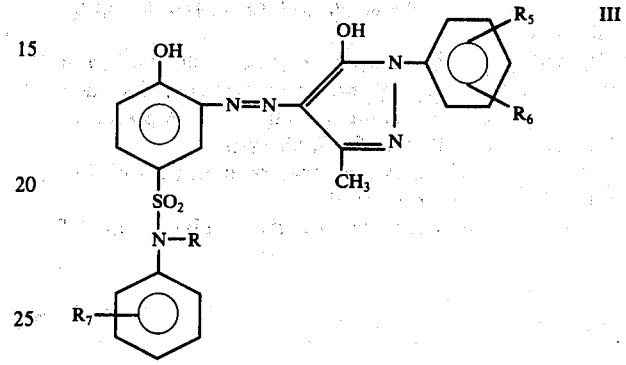

in which $R_5$, $R_6$, $R_7$ and R are as defined above.

The reaction of the compounds of formula II with the compounds of formula III may be carried out in a known manner, for example by the method described in German DAS No. 1,644,390 or U.S. Pat. No. 2,806,760. Preferably, the 1:1 chromium complex of the compound of formula II is reacted with stoichiometric amounts of the compound of formula III. The reaction is preferably carried out in an aqueous or aqueous-organic medium. Preferably, weakly alkaline to strongly alkaline conditions are employed, more preferably at a constant pH. Preferred reaction temperatures are in the range of from 20° to 100° C. On completion of the reaction, i.e. when all the 1:1 chromium complex has been reacted, the product may be salted out and dried.

In the compounds of formula I, any halogen atom is preferably chlorine, bromine or fluorine, more preferably chlorine.

Any lower alkyl radical in the compounds of formula I may be straight chain or branched and preferably contains 1 to 4, more preferably 1 or 2, carbon atoms, with methyl being especially preferred.

Preferred cations for $M^\oplus$ include lithium, sodium, potassium, ammonium, mono-, di-, tri- or tetra-$(C_{1-2})$alkylammonium or mono-, di-, tri- or tetra-$(C_{1-2})$alkanolammonium, with lithium, sodium, potassium, ammonium and tetra-$(C_{1-2})$alkylammonium being more preferred and sodium being the most preferred, sodium and potassium being even more preferred cation. However, any cation conventional in the art may be employed, whether mono-, di- or polyvalent.

Preferably, $R_1$ signifies chlorine or nitro and $R_2$ signifies a sulpho group. More preferably, $R_1$ signifies nitro and is in the 4-position and $R_2$ signifies a sulpho group in the 6-position.

Where $R_2$ has a significance other than sulpho, $R_4$ signifies a sulpho group and is preferably in the 3-, 4- or 5-position.

Preferably, each of $R_3$ and $R_4$, independently, signifies a hydrogen or chlorine atom or a methyl radical.

Where both of $R_3$ and $R_4$ have a significance other than hydrogen, preferably such substituents are in the 2,5-, 2,6- or 3,4-positions. More preferably, one of $R_3$ and $R_4$ signifies a hydrogen atom and the other signifies a chlorine atom. Even more preferably, both of $R_3$ and $R_4$ signify hydrogen.

Preferably, each of $R_5$ and $R_6$, independently, signifies a hydrogen or chlorine atom or a methyl radical. Where both of $R_5$ and $R_6$ have a significance other than hydrogen, preferably such substituents are in the 2,5-, 2,6- or 3,4-positions. More preferably, one of $R_5$ and $R_6$ signifies hydrogen and the other signifies a chlorine atom. Even more preferably, both of $R_5$ and $R_6$ signify hydrogen.

Preferably, $R_7$ signifies a hydrogen or chlorine atom or a methyl radical; the preferred positions for such chlorine or methyl substituent are the 2- and 4-positions. More preferably, $R_7$ signifies hydrogen.

R preferably signifies hydrogen or methyl, with hydrogen being more preferred.

Preferred compounds of formula I include those of formula Ia,

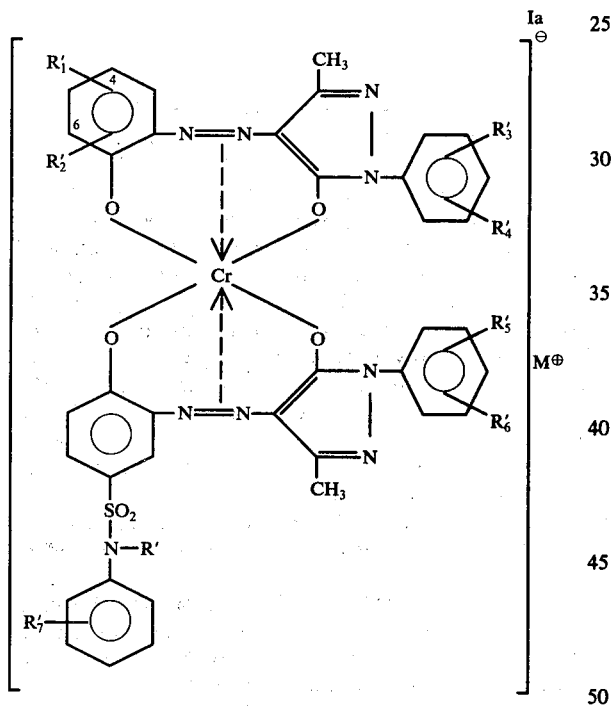

in which $R_1'$ signifies a chlorine atom or a nitro group,
$R_2'$ signifies a chlorine atom, a nitro or sulpho group,
$R_3'$ signifies a hydrogen or chlorine atom or a methyl radical,
$R_4'$ signifies a hydrogen or chlorine atom or a sulpho group,
$R_5'$ signifies a hydrogen or chlorine atom or a methyl radical,
$R_6'$ signifies a hydrogen or chlorine atom,
$R_7'$ signifies a hydrogen or chlorine atom or a methyl radical,
R' signifies a hydrogen atom or a methyl radical, and
$M^\oplus$ is as defined above. Preferably, each of M+ and the cation of the sulfo group (when in salt form) is independently lithium, sodium, potassium, ammonium or tetra-($C_{1-2}$alkyl)ammonium.

More preferred compounds of formula I include those of formula Ib,

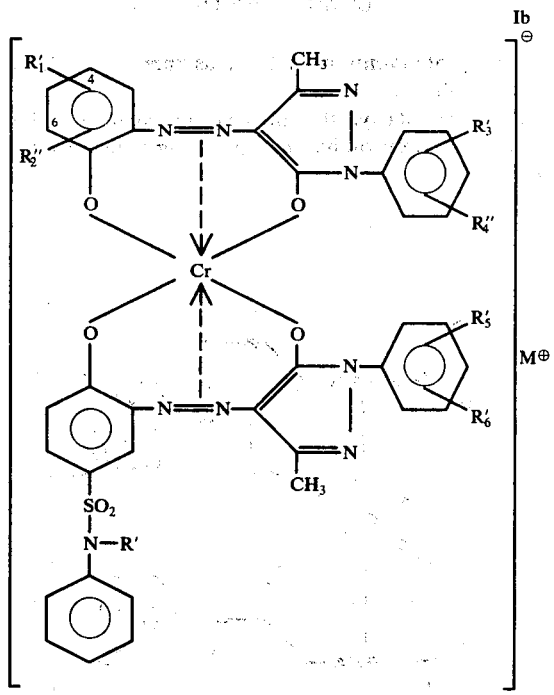

in which $R_1'$, $R_3'$, $R_5'$, $R_6'$, R' and M are as defined above,
$R_2''$ signifies a sulpho group, and
$R_4''$ signifies a hydrogen or chlorine atom.

Even more preferred compounds of formula I include those of formula Ic, Id and Ie,

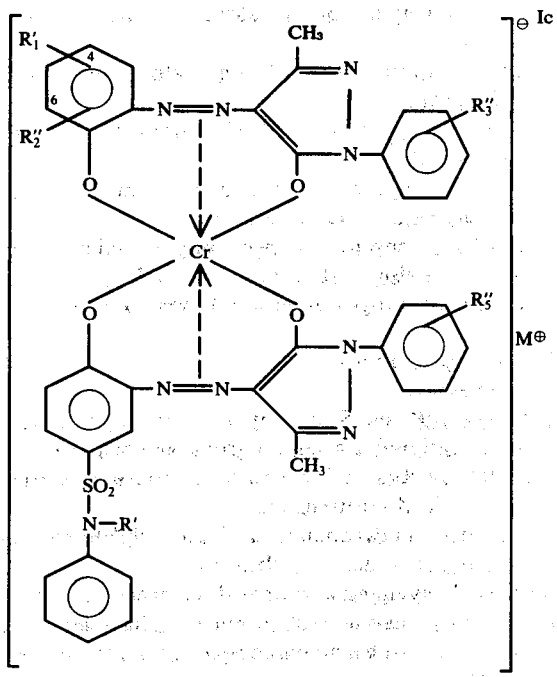

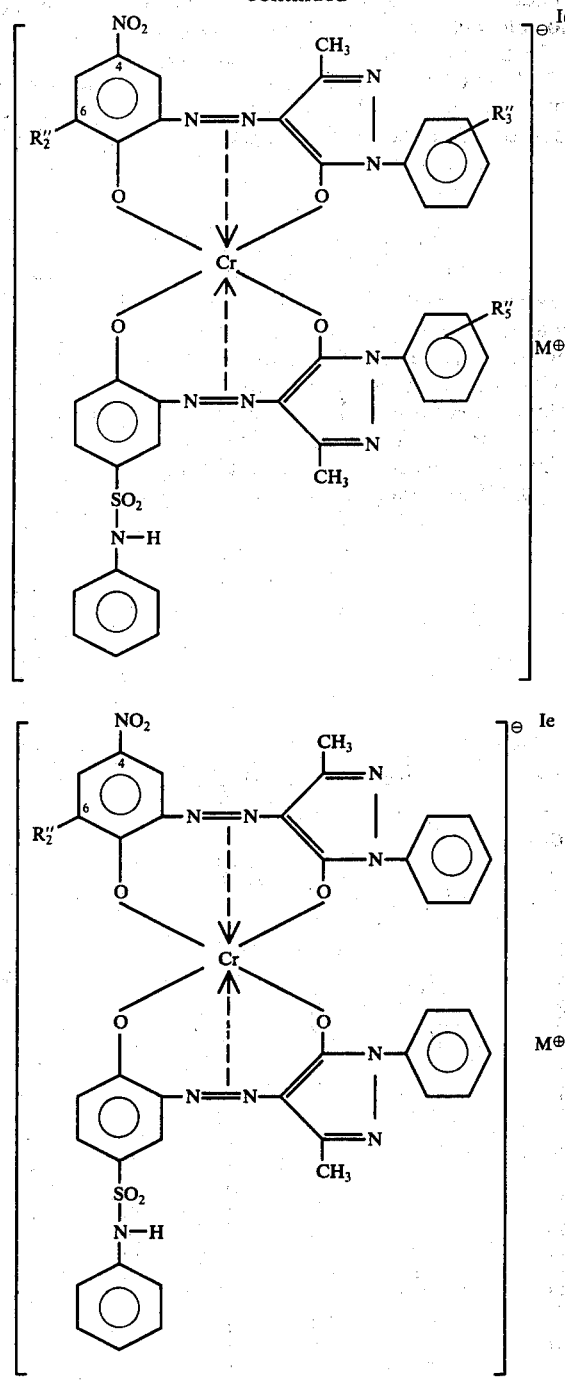

in which
R$_1'$, R$_2''$, R' and M$^\oplus$ are as defined above, and each of R$_3''$ and R$_5''$, independently, signifies a hydrogen or chlorine atom.

As will be appreciated, the sulpho group present in the compounds of formula I may be present in the free acid or salt form, more preferably the latter.

The cation of the salt form of the sulpho group may, for example, be any of those indicated above for M$^\oplus$. Depending on the reaction conditions employed in the preparation of or working up of the 1:2 chromium complexes of formula I, the cation of the salt form of the sulpho group may be the same as or different from the cation M$^\oplus$, preferably conditions are so chosen that they are the same.

The 1:1 chromium complex of the compounds of formula II, as defined above, may be prepared by known methods, for example in accordance with the method described in U.S. Pat. No. 2,806,760.

The compounds of formula III are known or may be prepared by known methods.

The compounds of formula I are indicated for use as dyes for dyeing or printing natural and synthetic organic substrates. Examples of substrates which can be dyed or printed with the compounds of formula I include natural or synthetic polyamides, e.g. wool, nylon and silk, polyurethane and basic modified polyolefins. Such substrates may be in loose fibre, yarn or fabric form. The compounds of formula I are also useful for dyeing synthetic polyamides in the mass and for dyeing leather and metals, especially anodized aluminum.

Conventional dyeing and printing methods may be employed.

The compounds of formula I may be employed alone or in combination with other asymmetric or symmetric 1:2 metal complex dyes.

The compounds of formula I have marked solubility in water and show notable light fastness, wet fastness (fastness to washing, water, seawater, acid and alkali perspiration and milling) and fastness to ironing, solvents, rubbing, chlorine, carbonizing and decatizing.

The compounds of formula I build up from a neutral bath on polyamide fibres in even shades.

The following Examples further serve to illustrate the invention. In the Examples all parts and percentages are by weight and temperatures are in degrees Centigrade.

EXAMPLE 1

The 1:1 chromium complex produced by known methods from 46.9 parts of the monoazo dye produced by coupling diazotised 4-nitro-2-aminophenol-6-sulphonic acid with 1-phenyl-3-methyl-5-pyrazolone, is stirred together with 44.9 parts of the monoazo dye produced by coupling diazotised 2-amino-1-hydroxybenzene-4-sulphonic acid-N-phenylamide with 1-phenyl-3-methyl-5-pyrazolone and with water to give a volume of 500 parts, and is dissolved at 80° at a pH of 10.0 after the addition of a 30% sodium hydroxide solution. In order to form the asymmetric 1:2 chromium complex, the pH of the reaction solution is kept at 10.0 by adding a 30% sodium hydroxide solution dropwise. On completion of the reaction, the solution is cooled and the pH is adjusted to 6.5 by the dropwise addition of 30% hydrochloric acid. The precipitated 1:2 chromium complex is filtered off, washed and dried.

The resulting dyestuff complex which agrees with the formula

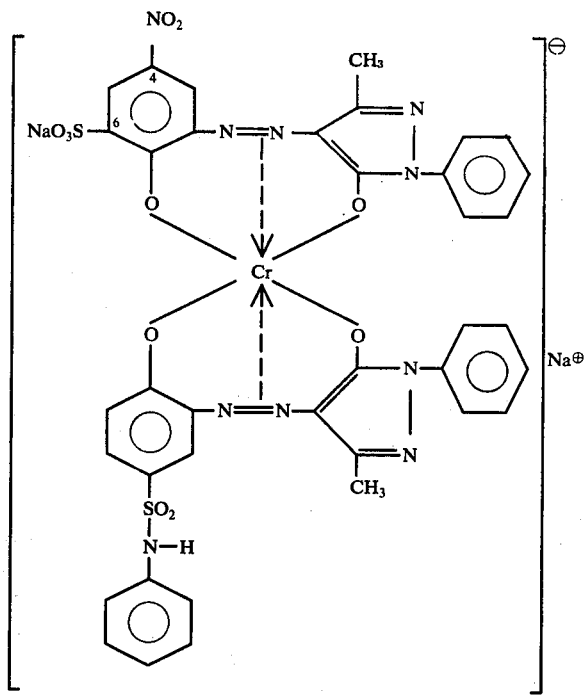

is soluble in water and dyes natural and synthetic polyamide fibres in orange shades. Dyeings obtained have notable wet fastness and fastness to light.

In the following Table further dyes are indicated which may be produced in accordance with the procedure of Example 1. The significances of the radicals $R_1$ to $R_7$ and R in the starting materials of formulae II and III are given in the Table.

APPLICATION EXAMPLE A 0.1 g of the dyestuff obtained in accordance with Example 1 are dissolved in 300 parts of water and 0.2 g of ammonium sulphate are added thereto. A previously moistened material (5 g of wool gabardine or 5 g of nylon satin) is subsequently introduced into the bath which is heated to boiling temperature over the course of 30 minutes. The water evaporated during the 30 minutes is replaced and dyeing is completed over the course of a further 30 minutes at boiling temperature.

TABLE

| Example | Compound of Formula II |  |  |  | Compound of Formula III |  |  |  | Shade on nylon |
|---|---|---|---|---|---|---|---|---|---|
|  | $Rk_1$ | $R_2$ | $R_3$ | $R_4$ | $R_5$ | $R_6$ | $R_7$ | R |  |
| 2 | 4-NO$_2$ | 6-SO$_3$H | 3'-Cl | H | H | H | H | H | orange |
| 3 | 4-NO$_2$ | 6-SO$_3$H | 2'-Cl | 5'-Cl | H | H | H | H | — |
| 4 | 4-NO$_2$ | 6-SO$_3$H | H | H | 3'-Cl | H | H | H | " |
| 5 | 4-NO$_2$ | 6-SO$_3$H | H | H | 2'-Cl | 5'Cl | H | H | " |
| 6 | 6-NO$_2$ | 4-SO$_3$H | 2'-CH$_3$ | 6'-Cl | 4'-Cl | H | H | H | " |
| 7 | 4-Cl | H | H | 4'-SO$_3$H | 2'-CH$_3$ | H | H | H | " |
| 8 | 4-Cl | 6-SO$_3$H | H | H | H | H | H | -CH$_3$ | " |
| 9 | H | 4-SO$_3$H | 2'-C$_2$H$_5$ | H | 2'-Cl | 6'-CH$_3$ | H | H | — |
| 10 | 4-NO$_2$ | 6-SO$_3$H | 3'-Cl | H | 4'-Cl | H | 4'-Cl | H | " |
| 11 | 4-NO$_2$ | 6-SO$_3$H | 2'-Cl | 5'-Cl | H | H | 4'-CH$_3$ | H | " |
| 12 | 4-NO$_2$ | 6-SO$_3$H | 2'-CH$_3$ | H | H | H | H | -CH$_3$ | " |
| 13 | 6-NO$_2$ | 4-SO$_3$H | H | H | H | H | H | H | " |
| 14 | 4-Cl | 6-SO$_3$H | H | H | H | H | H | H | " |
| 15 | 6-Cl | 4-SO$_3$H | H | H | H | H | H | H | " |
| 16 | 4-NO$_2$ | 6-SO$_3$H | 2'-Cl | H | H | H | H | H | " |
| 17 | 4-NO$_2$ | 6-SO$_3$H | 4'-Cl | H | H | H | H | H | " |
| 18 | 6-NO$_2$ | 4-SO$_3$H | 2'-Cl | H | H | H | H | H | " |
| 19 | 6-NO$_2$ | 4-SO$_3$H | 3'-Cl | H | H | H | H | H | " |
| 20 | 6-NO$_2$ | 4-SO$_3$H | 4'-Cl | H | H | H | H | H | " |
| 21 | 4-Cl | 6-SO$_3$H | 2'-Cl | H | H | H | H | H | " |
| 22 | 4-Cl | 6-SO$_3$H | 3'-Cl | H | H | H | H | H | " |
| 23 | 4-Cl | 6-SO$_3$H | 4'-Cl | H | H | H | H | H | " |
| 24 | 6-Cl | 4-SO$_3$H | 2'-Cl | H | H | H | H | H | " |
| 25 | 6-Cl | 4-SO$_3$H | 3'-Cl | H | H | H | H | H | " |
| 26 | 6-Cl | 4-SO$_3$H | 4'Cl | H | H | H | H | H | " |
| 27 | 6-Cl | 4-SO$_3$H | H | H | 4'CH$_3$ | H | H | H | " |
| 28 | 4-NO$_2$ | 6-SO$_3$H | H | H | 4'-C$_2$H$_5$ | H | H | H | " |
| 29 | 4-NO$_2$ | 6-SO$_3$H | H | H | 4'-isopropyl | H | H | H | " |
| 30 | 4-NO$_2$ | 6-SO$_3$H | H | H | 4'-n-butyl | H | H | H | " |
| 31 | 6-NO$_2$ | 4-SO$_3$H | 2'-Cl | H | H | H | H | -CH$_3$ | " |
| 32 | 4-NO$_2$ | 6-SO$_3$H | 4'-Br | H | H | H | H | H | " |
| 33 | 4-NO$_2$ | 6-SO$_3$H | H | H | 4'-Br | H | H | H | " |
| 34 | 4-NO$_2$ | 6-SO$_3$H | 4'-Br | H | 4'-Br | H | H | H | " |
| 35 | 4-Cl | 6-SO$_3$H | 4'-CH$_3$ | H | H | H | 4'-Cl | H | " |
| 36 | 4-Cl | 6-SO$_3$H | 4'-C$_2$H$_5$ | H | H | H | H | -CH$_3$ | " |
| 37 | 4-NO$_2$ | H | H | 4'-SO$_3$H | 2'-Cl | H | H | H | " |
| 38 | 4-NO$_2$ | H | 2'-Cl | 5'-SO$_3$H | 4'-Cl | H | H | H | " |
| 39 | 4-NO$_2$ | 6-SO$_3$H | 2'-Cl | H | 2'-Cl | H | H | H | " |
| 40 | 4-NO$_2$ | 6-SO$_3$H | 3'-Cl | H | 4'-Cl | H | H | H | " |
| 41 | 4-NO$_2$ | H | H | 3'-SO$_3$H | 3'-Cl | H | H | H | " |
| 42 | 4-Cl | H | H | 3'-SO$_3$H | 2'-Cl | H | H | -CH$_3$ | " |
| 43 | 4-NO$_2$ | 6-SO$_3$H | H | H | 2'-Cl | H | H | H | " |
| 44 | 4-NO$_2$ | 6-SO$_3$H | H | H | 4'-Cl | H | H | H | " |
| 45 | 4-NO$_2$ | 6-SO$_3$H | 2'-CH$_3$ | 6'-CH$_3$ | H | H | H | H | " |
| 46 | 4-Cl | 6-SO$_3$H | 2'-Cl | H | H | H | 2'-CH$_3$ | H | " |
| 47 | 6-Cl | 4-SO$_3$H | 2'-CH$_3$ | 6'-Cl | H | H | 2'-Cl | H | " |
| 48 | 6-Cl | 4-SO$_3$H | 2'-Cl | 5'-Cl | H | H | 2'-CH$_3$ | H | " |
| 49 | 4-NO$_2$ | 6-SO$_3$H | 4'-Br | H | 4'-Br | H | H | H | " |
| 50 | 4-NO$_2$ | 6-SO$_3$H | H | H | 2'-Cl | 6'-CH$_3$ | H | H | " |
| 51 | 4-NO$_2$ | 6-SO$_3$H | 3'-Cl | 4'-Cl | H | H | H | H | " |
| 52 | 4-NO$_2$ | 6-SO$_3$H | H | H | 3'-Cl | 4'-Cl | H | H | " |
| 53 | H | 4-SO$_3$H | 3'-Cl | H | 4'-Cl | H | H | H | " |
| 54 | 4-NO$_2$ | 6-Cl | H | 4'-SO$_3$H | 2'-Cl | H | H | H | " |
| 55 | 4-Cl | 6-NO$_2$ | H | 4'-SO$_3$H | 2'-CH$_3$ | H | H | H | " |
| 56 | 4-Cl | 6-Cl | H | 3'-SO$_3$H | 2'-Cl | 5'-Cl | H | H | " |
| 57 | 4-NO$_2$ | 6-NO$_2$ | H | 3'-SO$_3$H | 2'-Cl | 6'-CH$_3$ | H | H | " |

The dyed material is then rinsed. After drying, an orange dyeing with notable light and wet fastnesses is obtained.

The dyestuffs of Examples 2 to 57 of the Table may be employed in the same manner.

What is claimed is:

1. A compound of the formula wherein
R is hydrogen or alkyl of 1 to 4 carbon atoms,
$R_1$ is hydrogen, halo or nitro,
$R_2$ is hydrogen, halo, nitro or $-SO_3M''$,
$R_3$ is hydrogen, halo or alkyl of 1 to 4 carbon atoms,
$R_4$ is hydrogen, halo, alkyl of 1 to 4 carbon atoms or $-SO_3M''$,
each of $R_5$, $R_6$ and $R_7$ is independently hydrogen, halo or alkyl of 1 to 4 carbon atoms, and
$M^\oplus$ is a cation,
wherein $M''$ is hydrogen or a cation, and
each halo is independently fluoro, chloro or bromo, with the proviso that
i. $R_1$ and $R_2$ occupy the 4- and 6-positions,
ii. when $R_4$ is $-SO_3M''$, one of $R_1$ and $R_2$ is halo or nitro in the 4-position, and
iii. the compound contains a single $-SO_3M''$ group.

2. A compound according to claim 1 wherein
$M^\oplus$ is lithium, sodium, potassium, ammonium, mono-, di-, tri- or tetra-($C_{1-2}$)alkylammonium or mono-, di-, tri- or tetra-($C_{1-2}$hydroxyalkyl)ammonium, and
$M''$ is hydrogen, lithium, sodium, potassium, ammonium, mono-, di-, tri- or tetra-($C_{1-2}$alkyl)ammonium or mono-, di-, tri- or tetra-($C_{1-2}$hydroxyalkyl)ammonium.

3. A compound according to claim 2 wherein
$M^\oplus$ is lithium, sodium, potassium, ammonium or tetra-($C_{1-2}$-alkyl)ammonium, and
$M''$ is hydrogen, lithium, sodium, potassium, ammonium or tetra-($C_{1-2}$alkyl)ammonium.

4. A compound according to claim 3 wherein $M^\oplus$ is sodium or potassium, and $M''$ is hydrogen, sodium or potassium.

5. A compound according to claim 1 wherein
$R'$ is hydrogen or methyl,
$R_1'$ is chloro or nitro,
$R_2'$ is chloro, nitro or $-SO_3M''$,
$R_3'$ is hydrogen, chloro or methyl,
$R_4'$ is hydrogen, chloro or $-SO_3M''$,
$R_5'$ is hydrogen, chloro or methyl,
$R_6'$ is hydrogen or chloro,
$R_7'$ is hydrogen, chloro or methyl, and
$M^\oplus$ is a cation,
wherein $M''$ is hydrogen or a cation.

6. A compound according to claim 5 wherein
$M^\oplus$ is lithium, sodium, potassium, ammonium or tetra-($C_{1-2}$alkyl)ammonium, and
$M''$ is hydrogen, lithium, sodium, potassium, ammonium or tetra-($C_{1-2}$alkyl)ammonium.

7. A compound according to claim 5 wherein
$R_2'$ is $-SO_3M''$,
$R_4'$ is hydrogen or chloro, and
$R_7'$ is hydrogen.

8. A compound according to claim 5 wherein
$R_2'$ is $-SO_3M''$,
$R_3'$ is hydrogen or chloro,
$R_4'$ is hydrogen,
$R_5'$ is hydrogen or chloro,
$R_6'$ is hydrogen, and
$R_7'$ is hydrogen.

9. A compound according to claim 8 having the formula

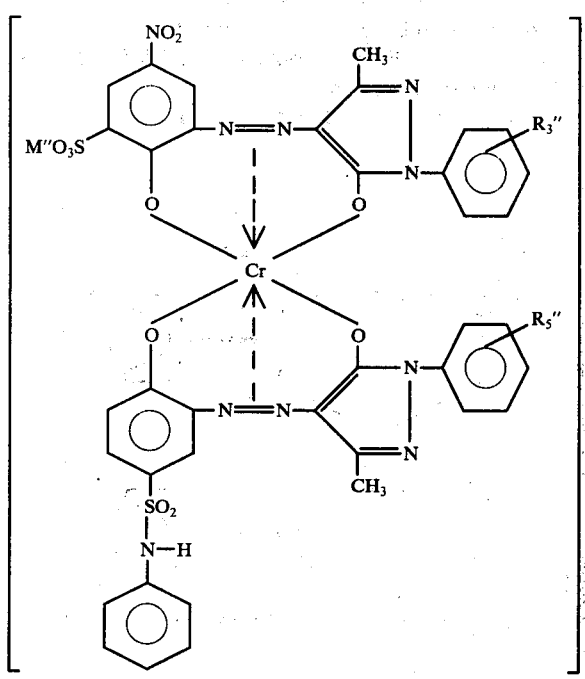

wherein
R$_3''$ is hydrogen or chloro,
R$_5''$ is hydrogen or chloro,
M$^\oplus$ is a cation, and
M'' is hydrogen or a cation.

10. A compound according to claim 9 wherein
R$_3''$ is hydrogen, and
R$_5''$ is hydrogen.

11. A compound according to claim 8 having the formula

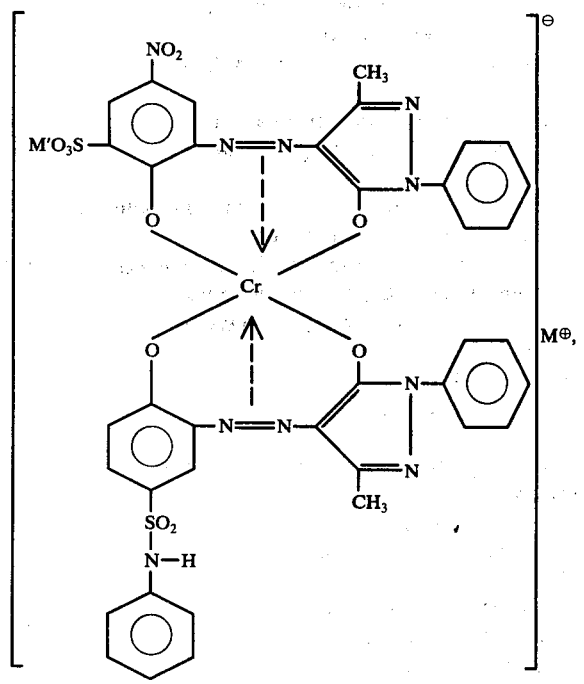

wherein

M$^\oplus$ is a cation, and
M' is a cation.

12. The compound according to claim 11 wherein
M$^\oplus$ is sodium, and
M' is sodium.

13. A compound according to claim 8 having the formula

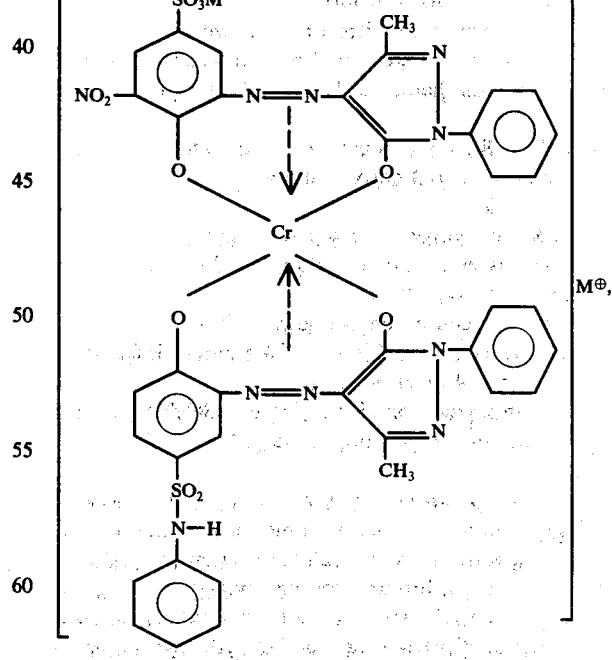

wherein
M$^\oplus$ is a cation, and
M' is a cation.

14. A compound according to claim 13 wherein

M⊕ is sodium or potassium, and

M' is sodium or potassium, with the proviso that M⊕ and M' are identical.

15. A compound according to claim 8 having the formula

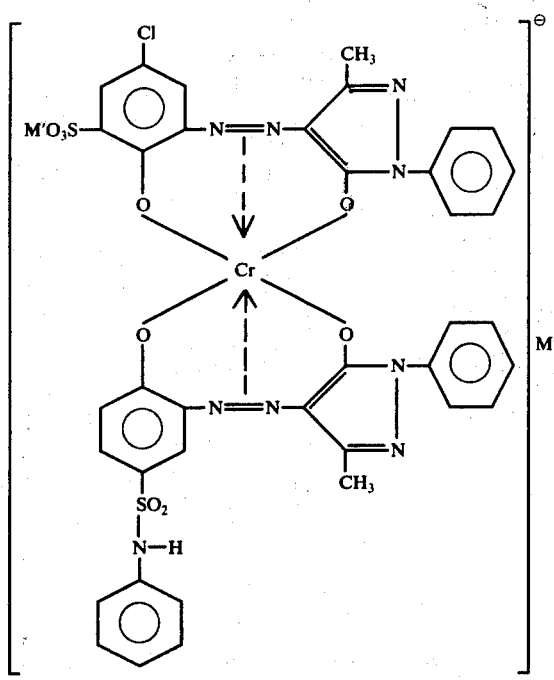

wherein

M⊕ is a cation, and

M' is a cation.

16. A compound according to claim 15 wherein

M⊕ is sodium or potassium, and

M' is sodium or potassium, with the proviso that M⊕ and M' are identical.

17. A compound according to claim 8 having the formula

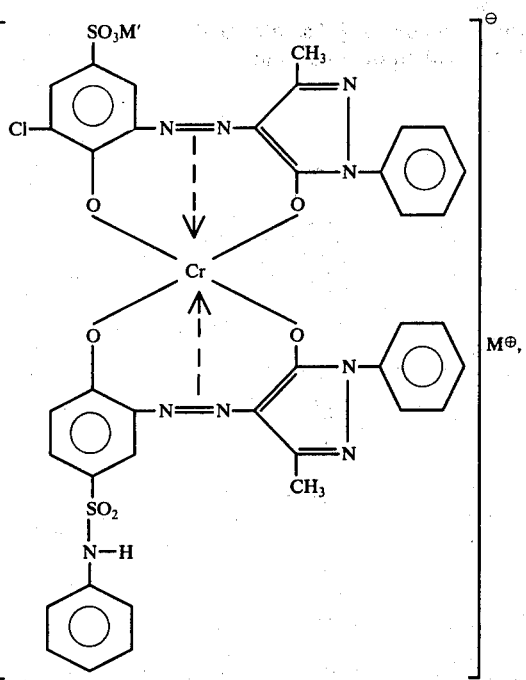

wherein
M⊕ is a cation, and
M' is a cation.
18. A compound according to claim 17
wherein
M⊕ is sodium or potassium, and
M' is sodium or potassium,
with the proviso that M⊕ and M' are identical.
19. A compound according to claim 8 having the formula

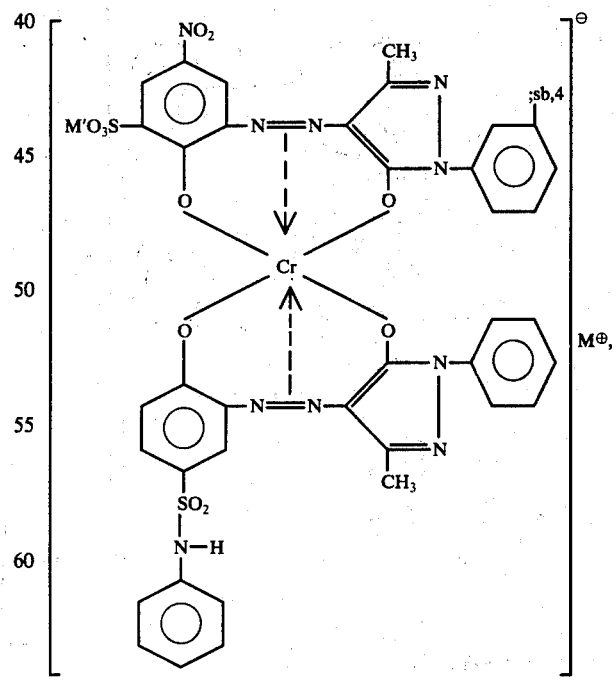

wherein
M⊕ is a cation, and
M' is a cation.

20. A compound according to claim 19 wherein
M⊕ is sodium or potassium, and
M' is sodium or potassium, with the proviso that M⊕ and M' are identical.

21. A compound according to claim 8 having the formula

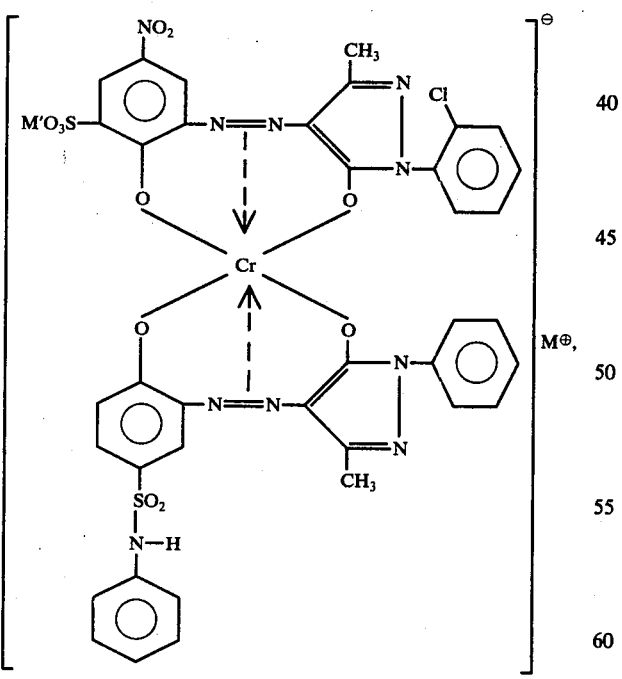

wherein
M⊕ is a cation, and
M' is a cation.

22. A compound according to claim 21 wherein
M⊕ is sodium or potassium, and
M' is sodium or potassium,
with the proviso that M⊕ and M' are identical.

23. A compound according to claim 8 having the formula

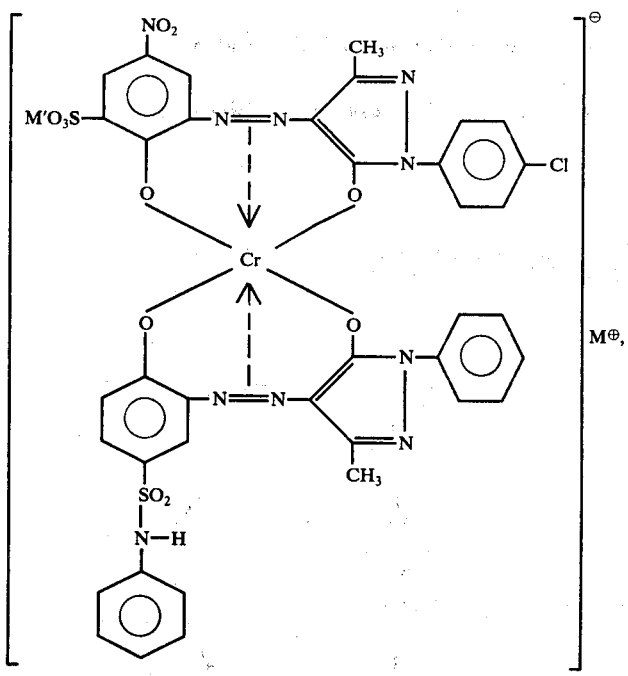

wherein
M⊕ is a cation, and
M' is a cation.

24. A compound according to claim 23 wherein
M⊕ is sodium or potassium, and
M' is sodium or potassium,
with the proviso that M⊕ and M' are identical.

25. A compound according to claim 8 having the formula

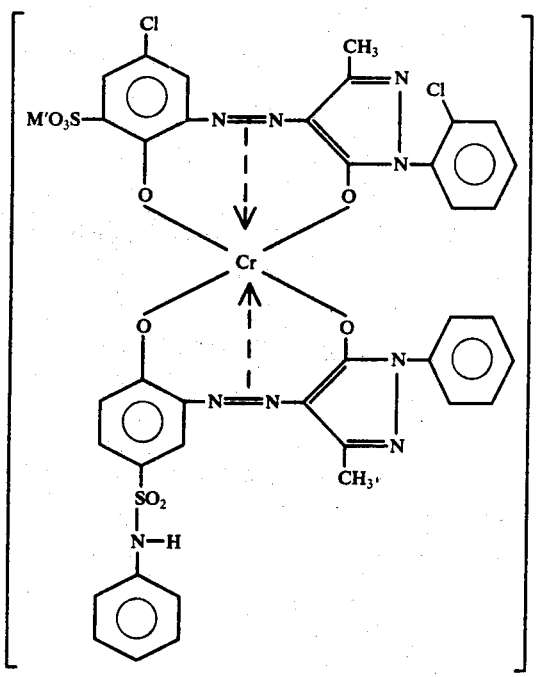

wherein

M⊕ is a cation, and

M' is a cation.

26. A compound according to claim 25 wherein

M⊕ is sodium or potassium, and

M' is sodium or potassium, with the proviso that M⊕ and M' are identical.

27. A compound according to claim 8 having the formula

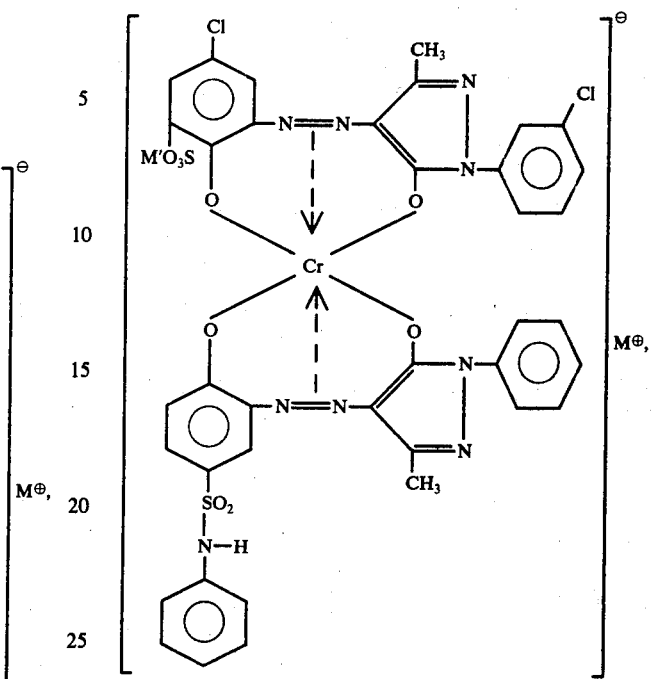

wherein
 M⊕ is a cation, and
 M' is a cation.
28. A compound according to claim 27
wherein
 M⊕ is sodium or potassium, and
 M' is sodium or potassium,
with the proviso that M⊕ and M' are identical.
29. A compound according to claim 8 having the formula

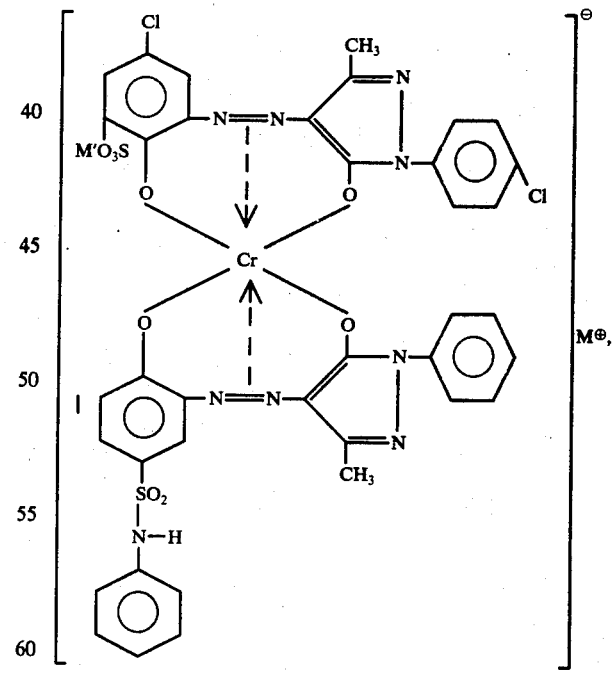

wherein
 M⊕ is a cation, and
 M' is a cation.
30. A compound according to claim 29
wherein
 M⊕ is sodium or potassium, and
 M' is sodium or potassium,
with the proviso that M⊕ and M' are identical.

* * * * *